June 2, 1970     D. A. STEWART     3,515,467
EYEGLASS BRIDGE ATTACHMENT FOR RELIEVING NOSE PAD PRESSURE
Filed March 22, 1968
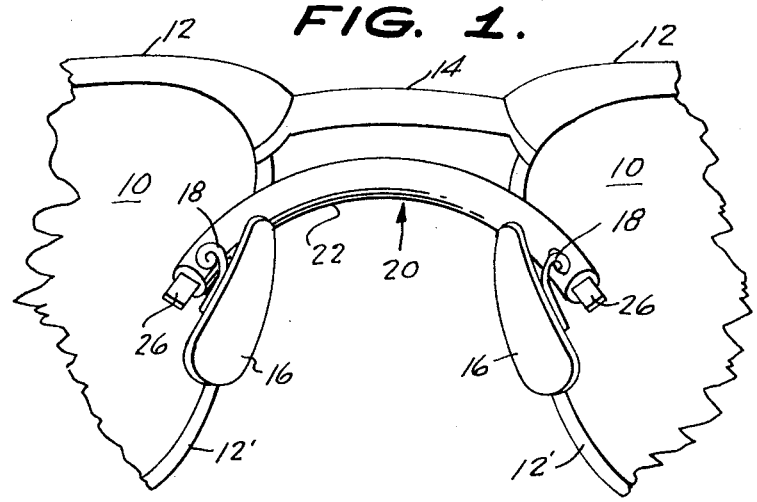
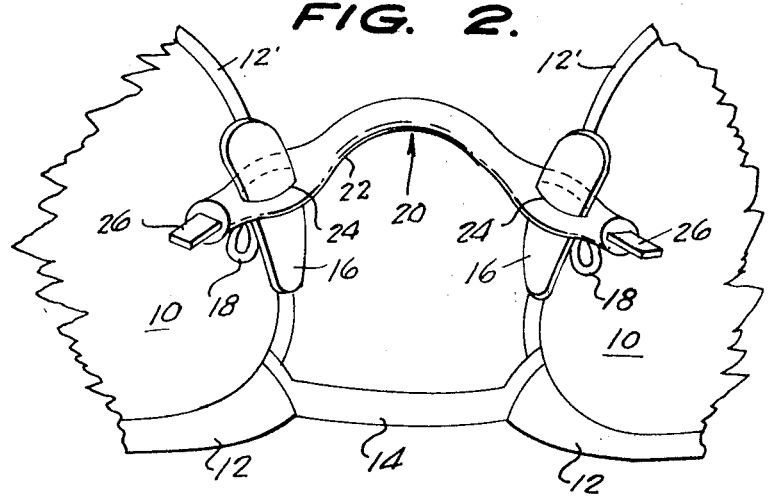
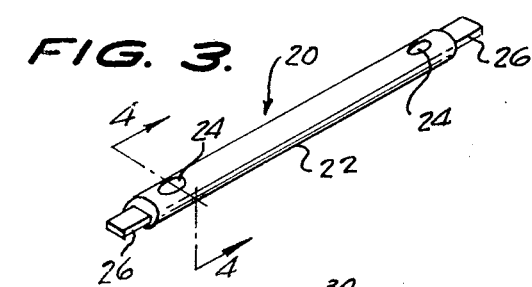
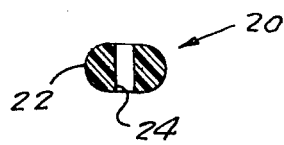
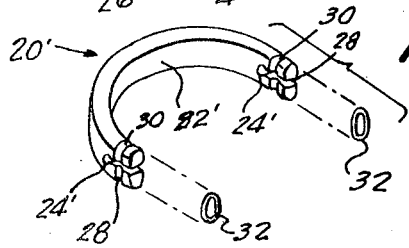
INVENTOR.
DALE A. STEWART,
BY
Berman, Davidson & Berman
ATTORNEYS.

United States Patent Office 3,515,467.
Patented June 2, 1970

3,515,467
EYEGLASS BRIDGE ATTACHMENT FOR RELIEVING NOSE PAD PRESSURE
Dale A. Stewart, 122 N. Mill, Beloit, Kans. 67420
Filed Mar. 22, 1968, Ser. No. 715,218
Int. Cl. G02c 5/10
U.S. Cl. 351—130      1 Claim

ABSTRACT OF THE DISCLOSURE

An attachment for eyeglasses of the nasal pad type, said device comprising a plastic bridge engageable with the pad-supporting wires and bearing on the upper portion of the nose of the eyeglass wearer whereby to relieve pressure on the nasal pads, said bridge having at each end thereof means to engage the nasal pad-supporting wires of the eyeglasses.

---

For many people, eyeglasses are their most indispensable item of wearing apparel in the sense that without their eyeglasses such people are quite literally helpless. In one of the more popular forms of eyeglasses, the weight of the glasses is borne entirely by a pair of nose pads. These pads are pivotally connected to a pair of curved arms which in turn are firmly mounted in the eyeglass frame. The pivotal mounting of the nose pads have the advantage of providing instant and automatic adjustment of the pads of the contours of the particular nose and in maintaining the glasses in reasonably stable condition or position relative to the eyes. Vertical stability, for instance, is exceedingly important where bifocals are concerned. A difficulty arises with such glasses, however, in that this design inherently brings the entire weight of the glasses to bear within the limited contact area of the nose pads, and if any soreness occurs for any reason within such contact area, the wearer is faced with the dire alternatives of intolerable discomfort with the glasses on or visual helplessness with the glasses off.

The present invention provides a cheap, easily attachable device for relieving pressure between the nose pads and the nose, transferring the pressure to the bridge of the nose for such period as may be required to overcome the soreness within the par area, after which the attachment may easily be removed.

The foregoing and other objects will be made clear from the following detailed description taken in connection with the annexed drawing, in which:

FIG. 1 is an elevational view of a pair of eyeglasses with the improved attachment in place;

FIG. 2 is a view similar to FIG. 1, with the glasses rotated 180 degrees from the position of FIG. 1, and the attachment shown in the process of being applied;

FIG. 3 is a perspective view of the attachment itself;

FIG. 4 is a section on the line 4—4 of FIG. 3; and

FIG. 5 is a perspective view of an alternative form of the device.

Referring now to FIGS. 1, 2 and 3, there is shown a pair of eyeglasses 10, each substantially surrounded by a rim 12 with the rim 12 connected by a bridge 14. In the normal design of glasses of this type, the bridge 14 is held out of contact with the nose or any other part of the features.

A pair of nose pads 16 are provided mounted on curved wires 18 which are embedded in a lower portion 12' of the rims 12. The nose pads 16 usually have a swivel mounting on the wires 18 so as to be automatically adjustable to the contours of the nose. The wires 18 have sufficient ductility to permit manual adjustment of the locations of the nose pads 16 by the optometrist at the time the glasses are fitted. The parts thus far described are entirely conventional.

The device or attachment which is the subject of this invention is designated generally by the numeral 20 and, as shown in FIGS. 3 and 4, comprises a length of extruded tube or rod stock 22. The precise material is not important provided it is compatible with the human skin and that it has a sufficient degree of elasticity, or, rather, that it has or is capable of sufficient elongation for the purpose. Numerous thermoplastics meet this qualification including polytetrafluoro ethylene, low to medium density polyethylene, the copolymers of ethylene-acrylate and ethylene-vinyl acetate. Polypropylene, either unmodified or as a copolymer, may be used as well as vinyl chloride, vinyl chloride acetate, and various urethane elastomers. Among thermosetting materials, the list is much more limited with possibilities in polyacrylic ester molding material or cast liquid urethane.

The length 22 of rod or tube stock has at each end an aperture 24 which preferably is somewhat elongated in the direction of length of the member 22. Optionally, the member 22 may be provided at each end with a projecting tongue 26 which, as will appear hereinafter, may be useful in placing the attachment on the glasses.

Referring now to FIG. 2, to apply the attachment 20 to the glasses, the apertures 24 are engaged at either end of the nose pads 16 and the material of the member 22 is sufficiently stretchable to permit the nose pads 16 to slide through the apertures 24 which thereupon contract to surround the wires 18 and bring the attachment 20 the position shown in FIG. 1. The tabs 26 form useful gripping points in drawing the member 22 over the nose pad 16 and may thereafter be snipped off. As an alternative, the member 22 itself may be made longer so as to project farther beyond the apertures 24 for the same manipulative purpose and the excess may readily be snipped away.

FIG. 5 shows an alternative form 20' which, like the member 22, may be either of rod or tube stock. In this case, however, the body 22', instead of being straight, as in FIG. 3, is given a preliminary fixed curvature by any of various thermal forming methods. The member 22' could, of course, be supplied with apertures 24, as in FIGS. 3 and 4, but in this particular case and, as an alternative structure, the member 22' is formed with transverse apertures 24' joined by a lengthwise slot 28 to provide a forked end. A circumferential groove 30 is provided to accommodate O-rings 32. In this case, the slots 28 receive the wires 18 which lodge in the apertures 24'. The O-rings 32 are then engaged in the circumferential groove 30, securely locking the structure 22 in the position to engage the bridge of the nose and relieve pressure between the nose pad 16 and the nose of the wearer.

Obviously, various structural modifications will suggest themselves to one studying the foregoing disclosure. It is not intended, therefore, to limit this invention to the details disclosed.

What is claimed is:

1. In combination with a pair of conventional eyeglasses having lens rims connected by a bridge and having nose pads connected to the rims by wires: a nose pad relieving attachment comprising an elongated strip of elastic plastic material having at each end means for engaging the wires connecting said nose pads to said rims, said means including a slotted, forked end which receives one of said wires, the forked end having an external circumferential groove which receives an O-ring to securely lock the forked end around said wire.

(References on following page)

References Cited

UNITED STATES PATENTS

| | | | |
|---|---|---|---|
| 1,751,804 | 3/1930 | Fischer | 351—118 |
| 2,066,735 | 1/1937 | Montgomery | 351—130 X |
| 3,233,956 | 2/1966 | De Angelis | 351—130 |
| 3,304,145 | 2/1967 | Hamm | 351—130 |

FOREIGN PATENTS 1,112,947  11/1955  France.

DAVID SCHONBERG, Primary Examiner

J. W. LEONARD, Assistant Examiner

U.S. Cl. X.R.

351—137